United States Patent [19]

Inoue et al.

[11] 4,338,228

[45] Jul. 6, 1982

[54] POLYOLEFIN COMPOSITION CONTAINING (A) FILLER (B) NUCLEATING AGENT AND (C) HEAT DETERIORATION INHIBITOR

[75] Inventors: Hiroshi Inoue, Ooi; Masaaki Isoi, Ogose; Makoto Yoda, Kawagoe; Masato Komatsu, Ooi, all of Japan

[73] Assignee: Toa Nenryo Kogyo Kabushiki Kaisha, Tokyo, Japan

[21] Appl. No.: 194,732

[22] Filed: Oct. 7, 1980

[30] Foreign Application Priority Data

Oct. 12, 1979 [JP] Japan ................. 54-130836

[51] Int. Cl.$^3$ ............... C08L 91/00; C08K 3/40; C08K 5/09; C08K 5/49
[52] U.S. Cl. ................. 524/120; 524/305; 524/384; 524/291; 524/343; 525/1; 525/4; 525/5; 525/78; 524/350; 524/531; 524/536
[58] Field of Search ............ 260/42.46, 42.43, 42.44, 260/42.45, 23.5 R, 23 AR, 23 H; 525/1, 4, 5, 78

[56] References Cited

U.S. PATENT DOCUMENTS

| | | | |
|---|---|---|---|
| 3,211,808 | 10/1965 | Young et al. | 525/78 |
| 3,367,926 | 2/1968 | Voeks | 525/4 |
| 3,437,550 | 4/1969 | Paul | 161/93 |
| 3,483,276 | 12/1969 | Mahlman | 260/897 |
| 3,868,433 | 2/1975 | Bartz et al. | 525/78 |
| 3,886,227 | 5/1975 | Van Brederode et al. | 260/836 |
| 3,929,702 | 12/1975 | Miller et al. | 525/1 |
| 3,966,845 | 6/1976 | Van Brederode et al. | 260/876 R |
| 3,997,503 | 12/1976 | Henman et al. | 260/42.46 |
| 4,000,111 | 12/1976 | Henman et al. | 260/42.46 |
| 4,078,017 | 3/1978 | Nagatoshi et al. | 525/193 |
| 4,198,327 | 4/1980 | Matsumoto et al. | 525/78 |
| 4,255,303 | 3/1981 | Keogh | 260/42.45 |

FOREIGN PATENT DOCUMENTS

| | | |
|---|---|---|
| 2708757 | 9/1977 | Fed. Rep. of Germany . |
| 2152975 | 4/1973 | France . |
| 49-029 | 12/1974 | Japan . |
| 52-110754 | 9/1977 | Japan . |
| 54-123158 | 9/1979 | Japan ................. 525/78 |
| 55-131031 | 10/1980 | Japan ................. 525/78 |
| 7900503 | 7/1980 | Netherlands ........... 525/78 |
| 1161162 | 8/1969 | United Kingdom . |
| 1338046 | 11/1973 | United Kingdom . |
| 1442527 | 7/1976 | United Kingdom . |

OTHER PUBLICATIONS

Derwent Abst. 82751B/46 BASF 11-8-79, DT2819597.
Derwent Abst. 02068B/02 BASF 1-4-79, DT2727381.
Derwent Abst. 43136A/24, Hitachi 5-8-78, J53050251.
Chem. Abst., vol. 84-45175m (1976), Binder et al.
Derwent Abst. 43096X/23 Mitsubishi Petro 4-24-76, J51047946.
Chem. Abst., vol. 91-40352b (1979), Sumitomo-Okita et al., JA79-6041.

Primary Examiner—John C. Bleutge
Assistant Examiner—Herbert L. Lilling
Attorney, Agent, or Firm—M. B. Kurtzman

[57] ABSTRACT

A polyolefin composition comprising a modified polyolefin obtained by adding an unsaturated carboxylic acid or an anhydride thereof to a polyolefin or mixtures of said modified polyolefin and an unmodified polyolefin, an inorganic filler, one or more nucleating agents or a combination thereof with one or more heat deterioration inhibitors, said polyolefin composition evidencing reduced deterioration by heat or reduction of its mechanical strength during a molding operation.

9 Claims, No Drawings

4,338,228

POLYOLEFIN COMPOSITION CONTAINING (A) FILLER (B) NUCLEATING AGENT AND (C) HEAT DETERIORATION INHIBITOR

BACKGROUND OF THE INVENTION

This invention relates to a polyolefin composition containing an inorganic filler. More particularly, it is concerned with an improved polyolefin composition which is prepared by incorporating an inorganic filler into a modified polyolefin obtained by adding an unsaturated carboxylic acid or an anhydride thereof into a polyolefin, or a mixture of such a modified polyolefin and an unmodified polyolefin, and which further contains a nucleating agent or a combination of a nucleating agent and a heat deterioration inhibitor. The improved polyolefin composition does not undergo any substantial deterioration by heat or substantial reduction of its mechanical strength during a molding operation.

It is known to incorporate an inorganic filler into a polyolefin, such as polyethylene and polypropylene, in order to improve its mechanical strength, dimensional stability and heat resistance. Various methods have been proposed for modifying a polyolefin, or treating an inorganic filler, in order to improve the adhesion between the polyolefin and the inorganic filler. For example, it is known to graft a poly-olefin with an unsaturated carboxylic acid or an anhydride thereof, such as acrylic acid, maleic acid and endo-cis-bicyclo[2,2,1]-5-heptene-2,3-dicarboxylic anhydride (Japanese Patent Publication Nos. 36421/1970, 4822/1974, 7334/1974, 15467/1975 and 49029/1974, and Japanese Patent Application Laid-Open Specification No. 110754/1977), or to treat the surfaces of glass fibers with an organic silane compound, a vinyl acetate resin, an ethylene-methyl acrylate copolymer, an ethylenevinyl acetate copolymer, or the like (Japanese Patent Publication Nos. 36421/1970, 7334/1974 and 49029/1974, and Japanese Patent Application Laid-Open Specification No. 110754/1977). Polyolefin resins reinforced with carbon or glass fibers have a very high mechanical strength, and are regarded as useful engineering plastics for a variety of applications.

The mechanical strength of any such polyolefin resin reinforced with an inorganic filler is, however, undesirably lowered when it is molded into a product having a large wall thickness. This reduction in mechanical strength is apparently due to the fact that the deterioration of the resin by heat occurs during its prolonged exposure to a high temperature. In extrusion, transfer or injection molding of a product having a large wall thickness of, say, at least 100 mm from the resin requires a cooling time which is as long as at least half an hour, and that the rapid growth of crystal grains of the polyolefin in the vicinity of its crystallization temperature lowers the affinity of polyolefin grains for one another and for the reinforcing filler, resulting in the low mechanical strength of the molded product.

In accordance with this invention it has been discovered that the addition of a heat deterioration inhibitor (i.e., oxidative inhibitor or stabilizer) and a nucleating agent can prevent any such reduction in the mechanical strength of a molded polyolefin product obtained by slow cooling.

SUMMARY OF THE INVENTION

Thus, this invention provides a polyolefin composition comprising (a) a modified polyolefin obtained by adding an unsaturated carboxylic acid or an anhydride thereof by, for example, graft polymerization or a mixture of any such modified polyolefin and an unmodified polyolefin, (b) an inorganic filler; and (c) a nucleating agent, or a combination thereof with a heat deterioration inhibitor.

DETAILED DESCRIPTION OF THE PREFERRED EMBODIMENT

The polyolefin which is used for the purpose of this invention may be selected from among homopolymers or copolymers of olefins, such as highpressure polyethylene, medium- and low-pressure polyethylene, an ethylene-propylene copolymer, an ethylene-butene-1 copolymer, polypropylene, a propyleneethylene copolymer, polybutene-1, and poly-4-methylpentene-1, or the mixture thereof. Polypropylene and a propylene-ethylene copolymer are, among others, preferred.

A modified polyolefin may be obtained by adding an unsaturated carboxylic acid or an anhydride thereof into any of the aforementioned polyolefins, and reacting them in the presence of absence of a radical forming agent to bond the unsaturated carboxylic acid or anhydride thereof chemically with the molecular chains of the polyolefin.

It is preferable to use an unsaturated carboxylic acid or an anhydride thereof selected from among alicyclic carboxylic acids having double bonds of the cis form in a ring, or the anhydrides thereof, such as cis-4-cyclohexane-1,2-dicarboxylic acid, cis-4-cyclohexane-1,2-dicarboxylic acid anhydride, endo-cis-bicyclo[2,2,1]-5-heptene-2,3-dicarboxylic acid, endo-cis-bicyclo[2,2,1]-5-heptene-2,3-dicarboxylic acid anhydride, endo-cis-bicyclo[2,2,1]-1,2,3,4,7,7-hexachloro-2-heptene-5,6-dicarboxylic acid, and endo-cis-bicyclo[2,2,1]-1,2,3,4,7,7-hexachloro-2-heptene-5,6-dicarboxylic acid anhydride. It is, however, possible to use acrylic acid, maleic acid, maleic anhydride, or the like, too. It is possible to add one or more of the aforementioned acids or anhydrides thereof.

The unsaturated carboxylic acid(s) or anhydride(s) thereof may be incorporated in the amount of 0.005 to 5.0 parts by weight, and preferably 0.01 to 1.0 part by weight, for 100 parts by weight of the polyolefin. Any of various known methods can be employed for bonding the unsaturated carboxylic acir or anhydride thereof chemically with the polyolefin. For example, it is possible to knead the polyolefin and the unsaturated carboxylic acid or anhydride thereof in their molten state at a temperature of 120° C. to 300° C., preferably 180° C. to 250° C., in the presence or absence of a radical forming agent, for example, an organic peroxide such as di-tert-butyl peroxide, dicumyl peroxide and benzoyl peroxide. Alternatively, the mixture of the polyolefin and the unsaturated carboxylic acid or anhydride thereof can be heated in water or an organic solvent in the presence of any such radical forming agent as mentioned above, or a water-soluble peroxide.

Illustrative, but non-limiting examples of the inorganic filler which can be used for the purpose of this invention include glass fibers, carbon fibers, talc, asbestos, glass powder, silica, alumina, clay, calcium carbonate, gypsum, anhydrous calcium sulfate, mica and iron oxide. Glass or carbon fibers are particularly preferred. If glass fibers, glass powder, silica and the like are used, it is desirable to treat their surfaces with an organic silane compound, such as aminosilane.

The nucleating agent can be selected from among metal salts of aliphatic carboxylic acids, aliphatic dicarboxylic acids, aromatic carboxylic acids, aromatic dicarboxylic acids or alkyl-substituted derivatives thereof, or dibenzylidenesorbitol, or the like. Specific examples of the metal salts of carboxylic acids include sodium, potassium, calcium or aluminum salts of stearic acid, adipic acid and sebacic acid, sodium benzoate, aluminum di-p-tert-butyl benzoate, titanium p-tert-butyl benzoate, chromium p-tert-butyl benzoate and aluminum monophenyl acetate. It is possible to use one or more of these nucleating agents.

Illustrative, but non-limiting example of the heat deterioration inhibitor include phenolic antioxidants such as 2,6-di-tert-butyl-p-cresol, 2,2'-methylene-bis(4-methyl-6-tert-butylphenol), tetrakis-[methylene-3-(3',5'-di-tert-butyl-4'-hydroxyphenyl)propionate] methane and tris-(3,5-di-tert-butyl-4-hydroxybenzoyl)isocyanate; phosphorous antioxidants such as cyclic neopentatetrylbis(octadecyl phosphite); and sulfur antioxidants such as dilauryl thiodipropionate and distearyl thiodipropionate. One or more of them are selected for use.

The polyolefin composition of this invention can be prepared if the aforementioned inorganic filler and nucleating agent, as well as the heat deterioration agent if required, are added into the modified polyolefin or a mixture thereof with an unmodified polyolefin, and they are melted by heating. Although there is no particular limitation to the method for melting them by a mixer such as a V-shaped blender, a ribbon blender, a tumbler and a Henschel mixer, and kneading the mixture by melting at 120° C. to 250° C. in a Banbury mixer, or a single- or multiple-screw extruder. The polyolefin composition of this invention can also be prepared by melting and kneading all of the polyolefin, the unsaturated carboxylic acid or anhydride thereof, the radical forming agent and the inorganic filler together.

While the proportions of the modified and unmodified polyolefins in the polyolefin composition of this invention depend on the quantity of the unsaturated carboxylic acid or anhydride thereof in the modified polyolefin, the composition may contain 3 parts by weight or more, and preferably 6 to 38 parts by weight, of the modified polyolefin, and 97 parts by weight or less, and preferably 94 to 62 parts by weight, of the unmodified polyolefin. The inorganic filler may be incorporated in the amount of 3 to 50 parts by weight, preferably 13 to 43 parts by weight, for 100 parts by weight of the modified polyolefin, or the mixture of the modified and unmodified polyolefins. The nucleating agent and the heat deterioration inhibitor may be incorporated in the amount of 0.03 to 3 parts by weight, preferably 0.05 to 1 part by weight, and 0.03 to 1 part by weight, preferably 0.05 to 0.5 part by weight, respectively, for 100 parts by weight of the mixture of the modified polyolefin or the mixture of the modified and unmodified polyolefins, and the inorganic filler.

The polyolefin composition of this invention as described herein does not undergo any reduction in its mechanical strength even when any molded product thereof having a particularly large wall thickness is slowly cooled, as opposed to any polyolefin composition known in the art.

The invention will now be described in further detail with reference to examples and comparative examples, in which parts are shown by weight.

EXAMPLE 1

1,000 parts of crystalline polypropylene powder having a melt flow rate (MFR) of 2.0 at 230° C., 10 parts of endo-cis-bicyclo[2,2,1]-5-heptene-2,3-dicarboxylic acid anhydride and 3 parts of di-tert-butyl peroxide were mixed by a Henschel mixer at room temperature. The resulting mixture was supplied into an extruder, and extrusion molded at 200° C. to form cylindrical pellets of a modified polypropylene having a diameter of 2 mm and a length of 3 mm. The modified polypropylene thus obtained contains 0.20 % by weight of the aforesaid dicarboxylic acid anhydride.

A 100-liter tumbler was charged with different proportions of the modified polypropylene obtained as hereinabove described, crystalline polypropylene (MFR 9.0), an inorganic filler [pitch carbon fibers having a low modulus of elasticity (LM), an average diameter of 14.5μ and an average length of 0.7 mm, and to which no surface treatment had been applied, chopped glass strands having an average diameter of 10μ and an average length of 6 mm, and treated with an organic silane compound, i.e., γ-aminopropyltriethoxysilane, or talc, a nucleating agent (A. aluminum di-p-tert-butyl benzoate, or B. dibenzylidenesorbitol), and a heat deterioration inhibitor [a mixture of 2,6-di-tert-butyl-p-cresol, 2,2'-methylene-bis(4-methyl-6-tert-butylphenol), tetrakis-[methylene-3-(3',5'-di-tert-butyl-4'-hydroxyphenyl)propionate]methane, and cyclic neopentatetryl-bis(octadecyl phosphite)] as shown in Table 1. After they were mixed preliminarily for five minutes, the resulting mixture was supplied into a 65 mm diameter vented extruder, and melted and kneaded at 220° C., whereby pellets of various compositions were prepared. Then, the pellets of each composition were dried in a drier at 120° C. for four hours, and molded by a screw in-line type injection molding machine into specimens for tensile strength tests (ASTM D638 Dumbbell #1). The tensile strength of each specimen was measured, and the results are shown in Table 1.

Each specimen for the tensile strength test was mounted in a frame sheet of polytetrafluoroethylene having the same shape as the specimen, and placed in an oven at 200° C. After it was melted in an hour, the oven temperature was lowered to 140° C., and the specimen was left for crystallization for (1) one hour and (2) three hours. After this heat treatment, the specimen was allowed to cool to room temperature, and removed from the frame. Then, the specimen was left to stand at a temperature of 20° C. and a humidity of 65% for 12 hours, and its tensile strength was measured. The results of the measurement are shown in Table 1.

Table 1 also shows Comparative Examples in which the compositions were prepared without incorporating any nucleus forming agent, heat deterioration inhibitor or modified polypropylene, and were molded in a similar way, and their tensile strength was likewise measured.

TABLE 1

| Test No. | Modified polypropylene (parts) | Polypropylene (parts) | Inorganic filler | | Nucleating agent | |
|---|---|---|---|---|---|---|
| | | | Kind | (parts) | Kind | (parts) |
| 1 | 75 | 0 | Carbon fibers LM | 25 | A | 0.2 |
| 2 | 15 | 60 | Carbon fibers | 25 | A | 0.05 |

TABLE 1-continued

| Test No. | | | | | | |
|---|---|---|---|---|---|---|
| 3 | 15 | 60 | LM Carbon fibers | 25 | A | 0.1 |
| 4 | 15 | 60 | LM Carbon fibers | 25 | A | 0.2 |
| 5 | 15 | 60 | LM Carbon fibers | 25 | A | 0.5 |
| 6 | 15 | 60 | LM Carbon fibers | 25 | A | 0.2 |
| 7 | 15 | 60 | LM Carbon fibers | 25 | B | 0.2 |
| 8 (Comparative) | 0 | 75 | LM Carbon fibers | 25 | A | 0.2 |
| 9 (Comparative) | 20 | 55 | LM Carbon fibers | 25 | — | 0 |
| 10 (Comparative) | 15 | 60 | LM Carbon fibers | 25 | — | 0 |
| 11 | 15 | 65 | LM Glass fibers | 20 | A | 0.2 |
| 12 (Comparative) | 15 | 65 | Glass fibers | 20 | — | 0 |
| 13 | 15 | 45 | Talc | 40 | A | 0.2 |
| 14 (Comparative) | 15 | 45 | Talc | 40 | — | 0 |

| Test No. | Heat deterioration inhibitor (parts) | Tensile strength before heat treatment ASTM D638 (kg/cm$^2$) | Tensile strength after heat treatment (1) ASTM D638 (kg/cm$^2$) | Tensile strength after heat treatment (2) ASTM D638 (kg/cm$^2$) |
|---|---|---|---|---|
| 1 | 0.4 | 540 | 470 | 460 |
| 2 | 0.4 | 550 | 440 | 420 |
| 3 | 0.4 | 550 | 460 | 440 |
| 4 | 0.4 | 560 | 470 | 460 |
| 5 | 0.4 | 560 | 480 | 480 |
| 6 | 0 | 550 | 420 | 390 |
| 7 | 0.4 | 550 | 460 | 450 |
| 8 (Comparative) | 0.4 | 410 | 360 | 340 |
| 9 (Comparative) | 0 | 520 | 300 | 270 |
| 10 (Comparative) | 0.4 | 550 | 300 | 280 |
| 11 | 0.4 | 750 | 670 | 650 |
| 12 (Comparative) | 0.4 | 750 | 360 | 320 |
| 13 | 0.4 | 440 | 410 | 400 |
| 14 (Comparative) | 0.4 | 440 | 360 | 320 |

EXAMPLE 2

The procedures of Example 1 were repeated for molding test specimens from polypropylene compositions obtained by mixing as shown in Table 2 different proportions of crystalline polypropylene having a MFR of 5.0 instead of 9.0 in Example 1, an inorganic filler selected from between the carbon fibers as described in Example 1 and polyacrylonitrile carbon fibers having a high modulus of elasticity and high strength (HT), an average diameter of 7μ and an average length of 1 mm, and treated with an organic silane compound as hereinbefore mentioned, and the modified polypropylene, nucleating agent and heat deterioration inhibitor as used in Example 1. The tensile strength of each specimen was likewise measured, and the results are shown in Table 2.

Table 2 also shows Comparative Examples in which compositions were prepared without incorporating any nucleating agent, and molded in a similar way, and their tensile strength was likewise measured.

TABLE 2

| Test No. | Modified polypropylene (parts) | Polypropylene (parts) | Inorganic filler Kind | (parts) | Nucleating agent Kind | (parts) |
|---|---|---|---|---|---|---|
| 15 | 15 | 60 | Carbon fibers LM | 25 | A | 0.2 |
| 16 (Comparative) | 15 | 60 | Carbon fibers LM | 25 | — | 0 |
| 17 | 15 | 65 | Carbon fibers HT | 20 | A | 0.2 |
| 18 (Comparative) | 15 | 65 | Carbon fibers HT | 20 | — | 0 |

| Test No. | Heat deterioration inhibitor (parts) | Tensile strength before heat treatment ASTM D638 (kg/cm$^2$) | Tensile strength after heat treatment (1) ASTM D638 (kg/cm$^2$) | Tensile strength after heat treatment (2) ASTM D638 (kg/cm$^2$) |
|---|---|---|---|---|
| 15 | 0.4 | 550 | 490 | 480 |
| 16 (Comparative) | 0.4 | 550 | 430 | 390 |
| 17 | 0.4 | 1,200 | 1,000 | 950 |
| 18 (Comparative) | 0.4 | 1,200 | 520 | 460 |

EXAMPLE 3

The procedures of Example 1 were repeated for molding test specimens from polypropylene compositions obtained by mixing as shown in Table 3 different proportions of crystalline polypropylene having a MFR of 3.0 instead of 9.0 in Example 1 or a crystalline propylene-ethylene block copolymer having a MFR of 3.0 and containing 7.0% by weight of ethylene, the carbon fibers as used in Example 1 for an inorganic filler, and the same modified polypropylene, nucleating agent and heat deterioration inhibitor as used in Example 1. The tensile strength of each specimen thus obtained was measured, and the results are shown in Table 3.

Table 3 also shows Comparative Examples in which no nucleating agent was used, and the results of the tensile strength tests conducted likewise for the sake of comparison.

TABLE 3

| Test No. | Modified polypropylene (parts) | Polypropylene Kind | (parts) | Inorganic filler Kind | (parts) | Nucleating agent Kind | (parts) |
|---|---|---|---|---|---|---|---|
| 19 | 15 | Homopolymer | 60 | Carbon fibers LM | 25 | A | 0.2 |
| 20 (Comparative) | 15 | Homopolymer | 60 | Carbon fibers LM | 25 | — | 0 |

TABLE 3-continued

| Test No. | | | | | | | |
|---|---|---|---|---|---|---|---|
| 21 | 25 | Block polymer | 50 | Carbon fibers LM | 25 | A | 0.2 |
| 22 (Comparative) | 25 | Block polymer | 50 | Carbon fibers LM | 25 | — | 0 |

| Test No. | Heat deterioration inhibitor (parts) | Tensile strength before heat treatment ASTM D638 (kg/cm$^2$) | Tensile strength after heat treatment (1) ASTM D638 (kg/cm$^2$) | Tensile strength after heat treatment (2) ASTM D638 (kg/cm$^2$) |
|---|---|---|---|---|
| 19 | 0.4 | 560 | 530 | 510 |
| 20 (Comparative) | 0.4 | 560 | 450 | 410 |
| 21 | 0.4 | 450 | 430 | 420 |
| 22 (Comparative) | 0.4 | 450 | 380 | 350 |

What is claimed is:

1. A polyolefin composition comprising:
   (a) a modified polyolefin obtained by adding an unsaturated carboxylic acid or anhydride thereof to a polyolefin, or a mixture of said modified polyolefin and an unmodified polyolefin;
   (b) an inorganic filler;
   (c) at least one nucleating agent which is a metal salt of aliphatic carboxylic acid, aliphatic dicarboxylic acids, aromatic carboxylic acids, aromatic dicarboxylic acids or alkyl-substituted derivatives thereof, or dibenzylidenesorbitol; and
   (d) and at least one heat deterioration inhibitor.

2. The polyolefin composition of claim 1 wherein said polyolefin is polypropylene.

3. The polyolefin composition of claim 1 wherein said polyolefin is a copolymer of propylene and ethylene.

4. The polyolefin composition of claim 1 wherein the inorganic filler is selected from the group consisting of glass fibers, carbon fibers, talc, asbestos, glass powder, silica, alumina, clay, calcium carbonate, gypsum, anhydrous calcium sulfate, mica and iron oxide.

5. The composition of claim 4 wherein the inorganic filler is selected from glass, carbon fibers and talc.

6. The polyolefin composition of claim 1 wherein the heat deterioration inhibitor is selected from the group consisting of phenolic antioxidants, phosphorous antioxidants and sulphur antioxidants.

7. The polyolefin composition of claim 6 wherein the phenolic antioxidants are selected from the group consisting of 2,6-di-tert-butyl-p-cresol, 2,2'-methylene-bis(4-methyl-6-tert-butylphenol, tetrakis-[methylene-3-(3',5'-di-tert-butyl-4'-hydroxyphenyl) propionate] methane and tris-(3,5-di-tert-butyl-4-hydroxybenzoyl)isocyanate; or mixtures thereof.

8. The polyolefin composition of claim 6 wherein the deterioration inhibitor is cyclic neopentatetrylbis(octadecyl phosphite).

9. The polyolefin composition of claim 6 wherein the deterioration inhibitor is dilauryl thiodipropionate and distearyl thiodipropionate.

* * * * *